Feb. 7, 1961. T. ONGARO 2,970,487
MECHANICAL VIBRATION GENERATOR
Filed Oct. 30, 1959 3 Sheets-Sheet 1
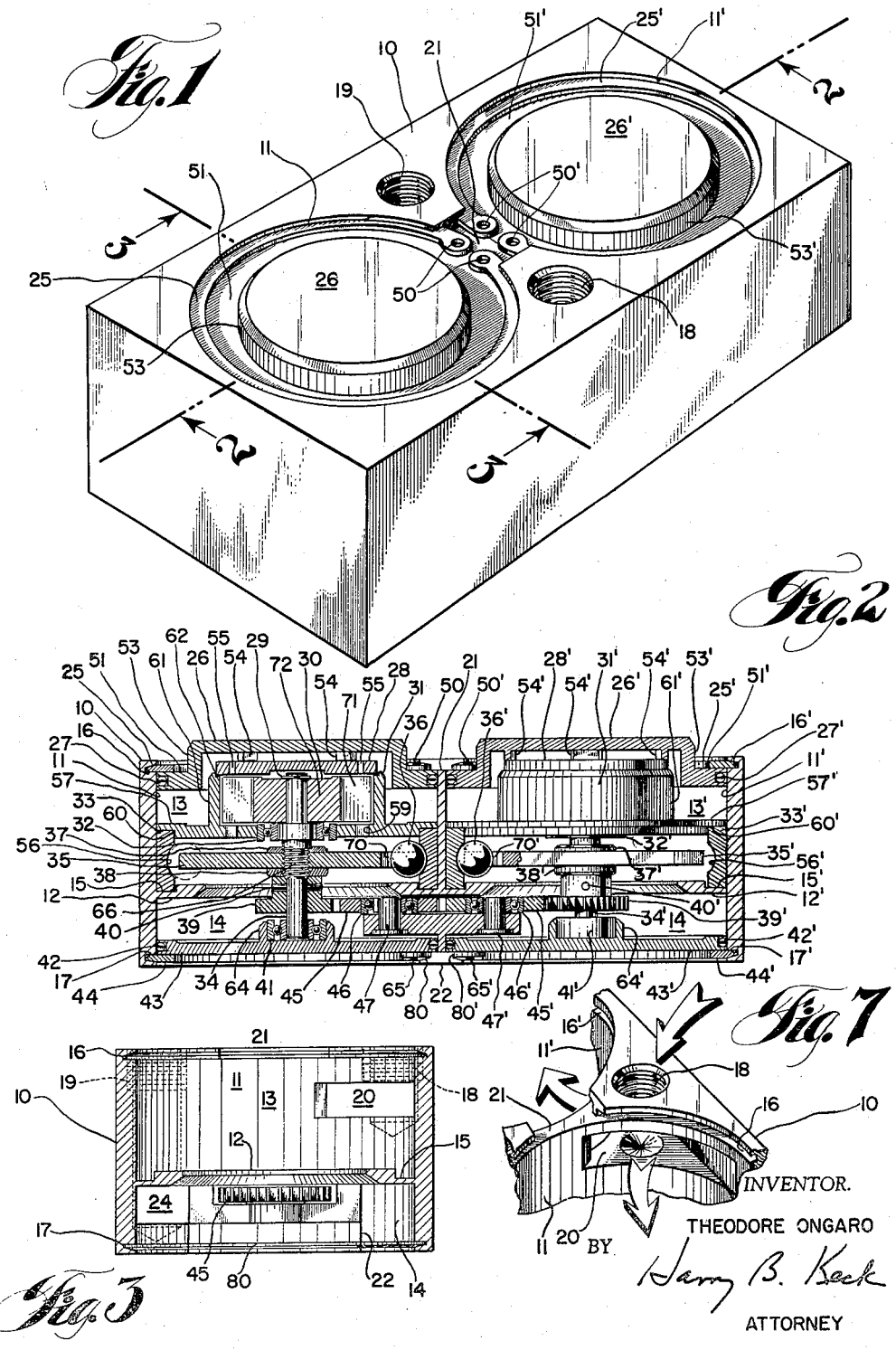
INVENTOR.
THEODORE ONGARO
BY Harry B. Keck
ATTORNEY

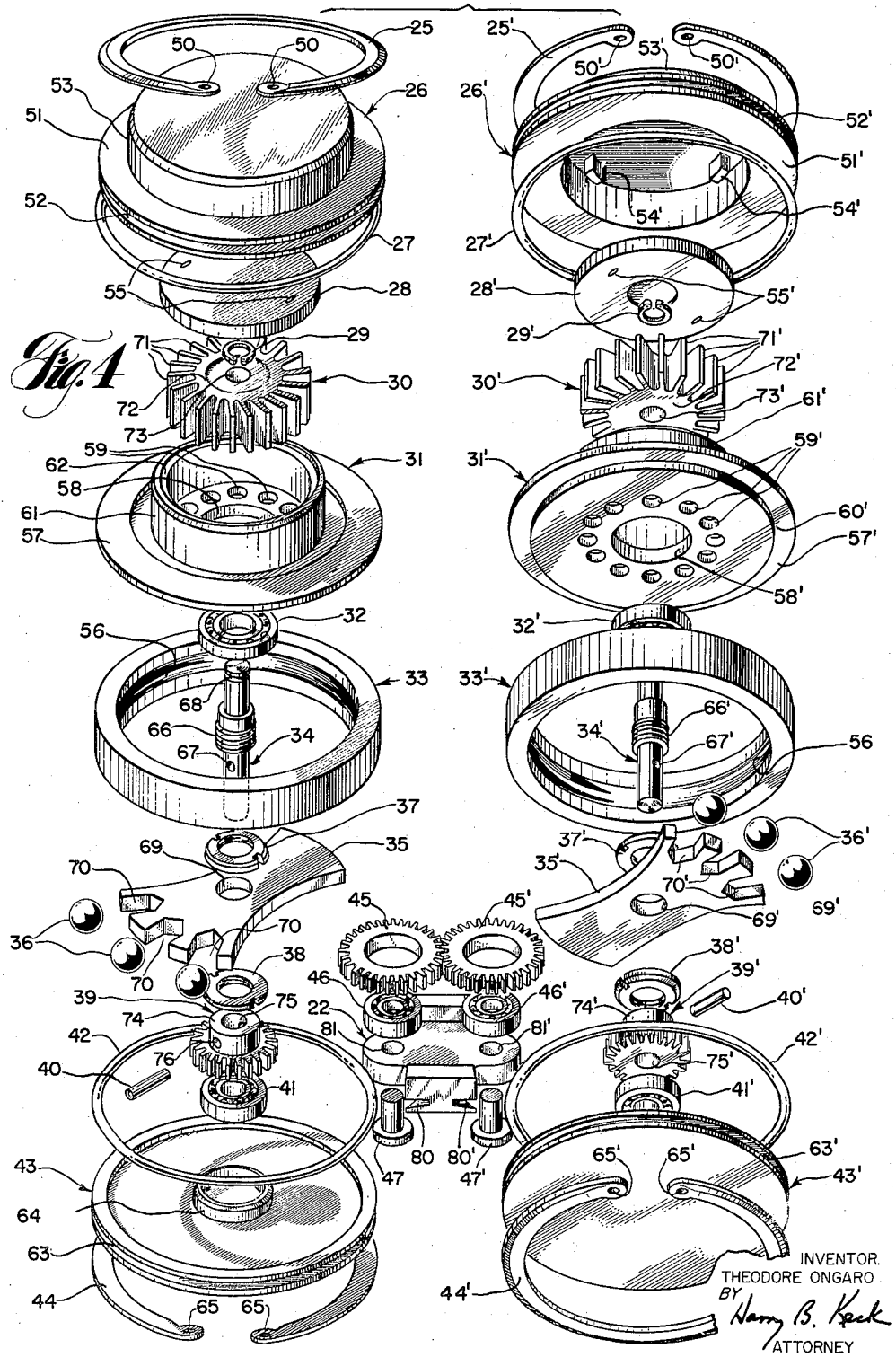

Feb. 7, 1961
T. ONGARO
2,970,487
MECHANICAL VIBRATION GENERATOR
Filed Oct. 30, 1959
3 Sheets-Sheet 3
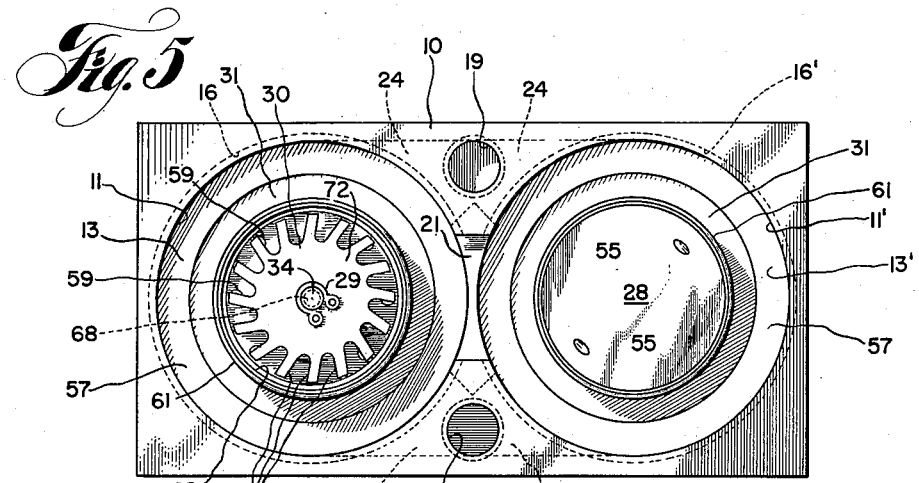
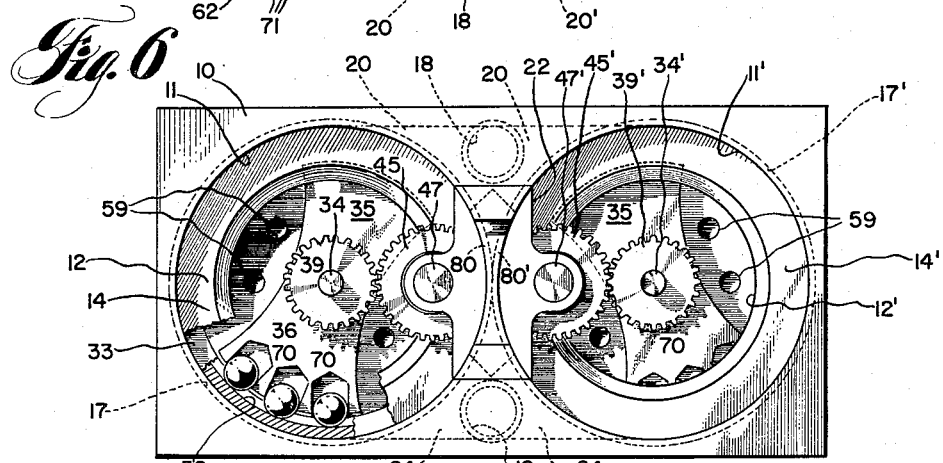
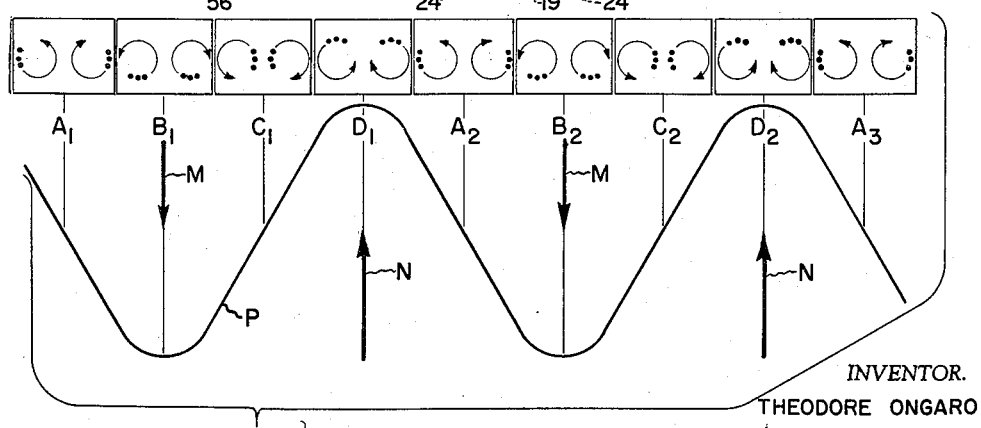
INVENTOR.
THEODORE ONGARO
BY
Harry B. Keck
ATTORNEY

United States Patent Office 2,970,487
Patented Feb. 7, 1961

2,970,487

MECHANICAL VIBRATION GENERATOR

Theodore Ongaro, Columbus, Ohio, assignor to International Research and Development Corporation Filed Oct. 30, 1959, Ser. No. 849,777

2 Claims. (Cl. 74—61)

The present invention relates to mechanical vibration generators. More particularly the present invention relates to compact mechanical generators capable of creating mechanical vibration over a wide range of frequencies.

According to the present invention, a compact mechanical vibration generator is provided having a compact, moisture-proof, trim construction which introduces versatility and adaptability. Outwardly the device can be made to resemble a rectangular block which can be carried in one hand and which can be positioned, for example, in a vat of liquid to introduce high frequency vibrations therein. The unique construction avoids torsional stresses derived from vibrations in the delicate moving parts of the structure. By employing fluid drive means, preferably a readily compressible gas such as air, the generated vibrations can be confined to a desired space.

Thus the principal object of the present invention is to provide a compact mechanical vibration generator.

A further object is to provide a mechanical vibration generator wherein the delicate moving parts are protected from the deteriorating effects normally associated with mechanical vibrations.

A further object is to provide a mechanical vibration generator which can be readily assembled and dismantled for inspection and repair.

A further object is to provide a mechanical vibration generator which itself does not set up undesirable vibrations in the motive source.

A still further object of the present invention is to provide a mechanical vibration generator capable of creating mechanical vibrations over a wide range of frequencies.

These and other objects and advantages of the present invention will become apparent in the following detailed description in which:

Figure 1 is a perspective illustration of a mechanical vibration generator constructed according to the present invention (without motive connections);

Figure 2 is a side elevation view, partly in cross-section, of the mechanical vibration generator taken along the line 2—2 of Figure 1; the left hand portion of Figure 2 is a true cross-section view, whereas the right hand portion of Figure 2 is a cut-away illustration;

Figure 3 is an end elevation view, partly in cross-section, of the mechanical vibration generator taken along the line 3—3 of Figure 1;

Figure 4 is an exploded perspective illustration showing the structural details of the internal elements of the mechanical vibration generator and illustrating their relationship and method of assembly;

Figure 5 is a top plan view of a partially dismantled vibration generator having the caps removed;

Figure 6 is a bottom plan view of a partially dismantled vibration generator having the cover plates removed;

Figure 7 is a fragmentary perspective illustration of the casing construction of the vibration generator illustrating the inlet means for hydraulic motive fluid; and Figure 8 is a schematic representation of the relative positions of the moving elements at various times and the resultant forces corresponding to each time.

Casing

The casing in which the vibration generator is assembled will be described by reference to Figures 1, 2 and 3. As seen in Figure 1, the casing generally comprises a rectangular block of material, preferably a light metal such as aluminum or magnesium. By constructing the casing from a light material, its initial resistance to laboratory movement can be minimized. If desired, suitable plastic materials could be employed for the casing. Such plastic materials should be impact resistant, should possess machinability and should be resistant to distortion. Four circular cross-section bores are provided in the casing 10. Two large bores 11 and 11' contain the moving portions of the structure. The large bores 11 and 11' have parallel axes and are laterally symmetrically disposed in the rectangular casing 10. By reference to Figure 2, it will be seen that the large bores 11 and 11' do not extend entirely through the casing 10, but instead, terminate internally to provide an annular shoulder 12 and 12'. The annular shoulders 12 and 12' separate the bores 11 and 11' into a cylindrical working chamber 13 and 13' and a synchronizing chamber 14 and 14'. An annular peripheral groove 15 and 15' is provided in the working chamber portion of the shoulder 12 and 12'. Additional annular peripheral grooves 16 and 16' and 17 and 17' are provided near the ends of the bores 11 and 11' to receive sealing tension rings as hereinafter will be described.

Smaller bores 18 and 19 are provided in the casing 10 for receiving and discharging respectively the working fluid which provides the motive force for the present structure. The circular bores 18 and 19 have axes parallel to the axes of the larger bores 11 and 11' and are positioned centrally therebetween. The fluid inlet bore 18 extends into the casing 10 to a depth not beyond the shoulders 12 and 12'. The fluid discharge bore 19 extends beyond the casing 10 beyond the shoulders 12 and 12'. Both of the fluid bores 18 and 19 have internally threaded portions adjacent to the upper surface of the casing 10 for convenient assembly of working fluid connections.

A smoothly curved passageway 20 is cut between the bores 11 and 11' and the fluid inlet bore 18 to allow for the introduction of operating fluid into the working chambers 13 and 13'. The smoothly curved passageway 20 should be maintained obstruction-free to allow a gradual expansion of the working fluid entering the structure through the bore 18. The central portion of the upper surface of the casing 10 between the bores 11 and 11' is removed to provide a flat surface 21 at the same level as the annular peripheral grooves 16 and 16'.

A smoothly curved passageway 24 is cut between the bores 11 and 11' and the fluid discharge bore 19 to allow for the removal of operating fluid from the synchronizing chambers 14 and 14'.

The central portion of the casing 10 between the synchronizing chambers 14 and 14' is removed to the depth of the annular shoulders 12 and 12' to provide a receiving chamber for a synchronizing shaft support 22 which will hereinafter be described.

Internal Assembly

The elements inserted in the casing 10 are illustrated in an exploded perspective view in Figure 4. These elements will be structurally described by reference to Figure 4 and their assembled relationship with each other and with the casing 10 will be described by reference to Figure 2.

The elements include a tension ring 25, a cap 26, an O-ring gasket 27, a jet plate 28, a tension ring 29, a vaned rotor 30, a rotor casing 31, a bearing 32, a ball race 33, a shaft 34, a ball rotor 35, spherical balls 36, lock-nuts 37 and 38, a synchronizing gear 39, a pin 40, a bearing 41, an O-ring gasket 42, a cover plate 43, a tension ring 44, a synchronizing gear 45, a bearing 46, a shaft 47, and a synchronizing shaft support 22.

The tension ring 25 comprises a segment of a flat circular ring, open at one portion. The open ends of the tension ring 25 are provided with openings 50 to permit the open ends to be brought together whereby the tension ring 25 may be distorted into a non-circular configuration to permit its insertion into the circular annular groove 16. On release of the two open ends, the tension ring 25 is restored to its circular configuration and becomes tightly secured in the annular groove 16. The end portions of the tension ring 25 which carry the holes 50 lie on the flat surface 21.

A cap 26 has a circular flange 51 with a peripheral semi-circular groove 52. A smaller cylindrical cup 53 surmounts the circular flange 51. A plurality of spacer lugs 54 are provided on the flat inner surface of the cup 53. The O-ring gasket 27 fits into the semi-circular peripheral groove 52 to provide a fluid-tight seal between the cap 26 and cylindrical bore 11.

The jet plate 28 is provided with one or more angularly drilled openings 55 to permit the passage therethrough of operating fluid in an angular direction with respect to the axis of the bore 11.

The ball race 33 is a cylindrical section of wear-resistant metal having an outer diameter corresponding to that of the bore 11. A groove 56 is provided along the inner wall of the ball race 33 to present a circular sector path for the rotary movement of spherical balls 36. The ball race 33 is positioned in the working chamber 13 against the shoulder 12. The annular groove 15 receives the ball race 33.

The rotor casing 31 comprises a flat circular plate 57 having a central opening 58 and a plurality of satellite openings 59. A peripheral groove 60 is provided to permit the rotor casing 31 to fit into the ball race 33. A cylindrical section 61 is mounted on the plate 57 surrounding the openings 58 and 59. A groove 62 is provided on the upper surface of the cylindrical section 61 to receive the jet plate 28.

The cover plate 43 has an outer diameter corresponding to that of the bore 11 and is provided with a peripheral semi-circular groove 63 to receive the O-ring 42 and provide a tight seal for the synchronizing chamber 14 between the cover plate 43 and the bore 11. A circular bearing receiving cup 64 is centrally positioned on the inner surface of the cover plate 43.

The tension ring 44 is equipped with openings 65 and serves a similar function as the already described tension ring 25, i.e., it is tightly engaged in the annular groove 17 to confine the cover plate 43.

The shaft 34 is a metallic cylinder having a threaded bushing 66 in its central portion, a pin-receiving opening 67 and a peripheral groove 68.

The ball rotor 35 is a flat plate having arcuate outer surfaces and a central opening 69. Preferably the ball rotor 35 is constructed of very strong, light material such as laminated plastic. One of the arcuate outer surfaces is provided with ball-receiving openings 70 through which the spherical balls 36 may freely turn. The ball rotor 35 is secured to the threaded bushing 66 by means of the lock-nuts 37 and 38. The bearing 32 fits over the shaft 34 above the bushing 66. The ball rotor 35 directs movement of the balls 36 but is disconnected from mechanical ties with them so that the balls 36 are free to roll and turn.

The vaned rotor 30 has turbine blades 71 extending radially from a center core 72 with a central bore 73. The vaned rotor 30 is secured to the shaft 34 above the bearing 32. A small tension ring 29 fits into the groove 68 of the shaft 34 to retain the vaned rotor 30.

The synchronizing gear 39 has a collar 74 and a circular opening 75 to surround the shaft 34. A pin-receiving opening 76 extends through the collar 74 in alignment with the pin-receiving opening 67. The pin 40 is inserted through the pin-receiving openings 76 and 67 to secure the synchronizing gear 39 against rotation with respect to the shaft 34. The bearing 41 fits over the bottom end of the shaft 34.

In assembled relation, the bearing 41 is secured in the bearing receiving cup 64 of the cover plate 43. The shaft 34 extends upwardly coaxially with the bore 11. The ball rotor 35 is positioned centrally within the ball race 33. The spherical balls 36 are loosely confined in the ball receiving openings 70 to permit their rolling engagement with the circular section groove 56 of the ball race 33. The outer surface of the bearing 32 fits into the central opening 58 of the rotor casing 31. The vaned rotor 30 is confined in the circular chamber formed by the cylindrical section 61 of the rotor casing 31 and the jet plate 28. The spacer lugs 54 engage the jet plate 28 securely against the annular groove 62 of the rotor casing 31.

*Synchronizing mechanism*

The synchronizing mechanism is mounted in the bottom of the casing 10 in and between the two cylindrical bores 11 and 11' below the annular shoulders 12 and 12'. The synchronizing shaft support 22 has grooves 80 and 80' to match the annular grooves 17 and 17' which receive the tension rings 44 and 44'. Symmetrical bores 81 and 81' are provided to receive the vertically upwardly extending shafts 47 and 47'. The bearings 46 and 46' fit over the shafts 47 and 47'. The synchronizing gears 45 and 45' surround the bearings 46 and 46'. The gears 45 and 45' are of identical construction and are in meshing engagement with each other. The gear 45 also meshes with the synchronizing gear 39; the gear 45' meshes with the synchronizing gear 39'.

*Operation*

Working fluid such as pressurized air, is introduced into the bore 18 whence it expands slightly in traversing the passageways 20 to enter the working chambers 13 and 13' above the rotor casings 31 and 31'. The only openings for the escape of the pressurized air from the working chamber 13 are the jet openings 55 in the jet plate 28. Accordingly the pressurized air moves downwardly angularly through the jet openings 55 against the turbine blades 71 of the vaned rotor 30 causing rotation thereof. The exhausted air escapes from the rotor casing 31 through the satellite openings 59 and is withdrawn through the passageways 24 which connect the synchronizing chambers 14 and 14' with the fluid discharge bore 19. The spent gases are exhausted through the fluid discharge bore 19.

Rotation of the vaned rotor 30 causes rotation of the axial shaft 34 and the elements secured thereto. Thus the ball rotor 35, serving as a mass-moving arm, is caused to rotate at the same speed as the vaned rotor 30. The heavy metal balls 36 are pushed around the circular ball race 33 to generate a constantly changing radially outwardly directed force. The synchronizing gears 39, 45, 45' and 39' are in constant meshing relation to assure counter-rotation of the two shafts 34 and 34' at the same velocity and angular relationship.

The counter-rotating weights carried by the ball rotors 35 cooperate to generate equal amplitude mechanical vibrations during each rotation thereof. The principle of generating mechanical vibrations by counter-rotating weights is well known. Such vibrations are confined in the present invention to a single plane since the centrifugal forces in other planes are effectively cancelled. To effect the desired cancellation, the rotating weights should be positioned (i.e., synchronized) by meshing the synchronizing gears 39, 45, 45' and 39' to achieve the relative positions indicated in the schematic diagrams of Figure 8. Thus the spherical balls will assume the positions illustrated sequentially in Figures A-1, B-1, C-1, D-1, A-2, B-2, C-2, D-2, A-3, et cetera. In the positions indicated by the illustrations A1, C-1, A-2, C-2, A-3, et cetera, the centrifugal force generated by the rotating weights is totally cancelled. However, in the positions shown in illustrations B-1 and B-2 the entire centrifugal force generated by the system is exerted in the direction indicated by the arrows M. Similarly in the positions shown in illustrations D-1, D-2, the entire centrifugal force generated by the system is exerted in the direction indicated by the arrows N.

The resultant sinusoidal force generated by the system is indicated by the sinusoidal curve P. As a result, the entire structure vibrates in a direction which is perpendicular to a plane formed by the parallel axes of the rotating shafts 34 and 34'. The frequency of vibrations is dependent solely upon the rotational speed of the vaned rotor 30 and associated rotating structure on the shaft 34. The rotational speed and hence the frequency of the generated mechanical vibrations can be regulated by controlling the pressure of working fluid introduced into the fluid inlet bore 18. A manual or automatic control valve may be provided in the fluid inlet conduit (not shown) for this purpose.

The entire assembly, except for the balls 36 and 36' preferably is constructed of lightweight materials such as light metals, lightweight plastics or laminated plastics and the like. Resultant mechanical vibrations of sufficient amplitude are generated to cause vibrations in the medium surrounding the casing 10.

The compact vibration generator of this invention can be suspended (by means of flexible working fluid conduits coupled to the apertures 18 and 19 for example) in a vat of fluid. Vibrations generated by the structure are transmitted to the body of fluid to set up vibrations of the same frequency therein.

According to the provisions of the patent statutes, I have explained the principle, preferred embodiment and mode of operation of my invention and have illustrated and described what I now consider to represent its best embodiment. However, I desire to have it understood that, within the scope of the appended claims, the invention may be practiced otherwise than as specifically illustrated and described.

I claim:

1. A vibration generator comprising a casing having two parallel bores, each of said bores being axially separated sequentially into an enclosed working chamber, a ball race chamber and a synchronizing chamber, a rotatable shaft coaxially mounted within each bore, gearing means carried by each shaft within each synchronizing chamber and further communicating between the said bores to maintain a constant reversed angular relationship of the said shafts, a circular raceway for rolling movement of equal masses in each said ball race chamber, a mass-moving arm in each said ball race chamber carried by and extending radially from each shaft, equal masses carried by but disconnected from each of said mass-moving arms in rolling engagement with each said circular raceway, a fluid driven rotor secured to each of said shafts within each said enclosed working chamber, a passageway in said casing for introducing pressurized working fluid into each said working chamber in working relationship with each said rotor, a fluid passageway extending along each bore from the enclosed working chamber through said ball race chamber and said synchronizing chamber, and a passageway in said casing communicating with each said synchronizing chamber for withdrawing working fluid.

2. A vibration generator according to claim 1 wherein each said rotatable shaft is entirely confined within the said casing.

References Cited in the file of this patent

UNITED STATES PATENTS

| | | |
|---|---|---|
| 2,420,793 | O'Connor | May 20, 1947 |
| 2,436,251 | Dobie et al. | Feb. 17, 1948 |
| 2,496,291 | High | Feb. 7, 1950 |
| 2,501,158 | Chilcott | Mar. 21, 1950 |
| 2,778,230 | Peterson | Jan. 22, 1957 |